Aug. 12, 1930.  A. E. LINKE  1,773,048
CUTTER
Filed Nov. 20, 1929  2 Sheets-Sheet 1

Inventor
August E. Linke
By Clarence A. O'Brien
Attorney

Aug. 12, 1930.          A. E. LINKE          1,773,048
CUTTER
Filed Nov. 20, 1929          2 Sheets-Sheet 2
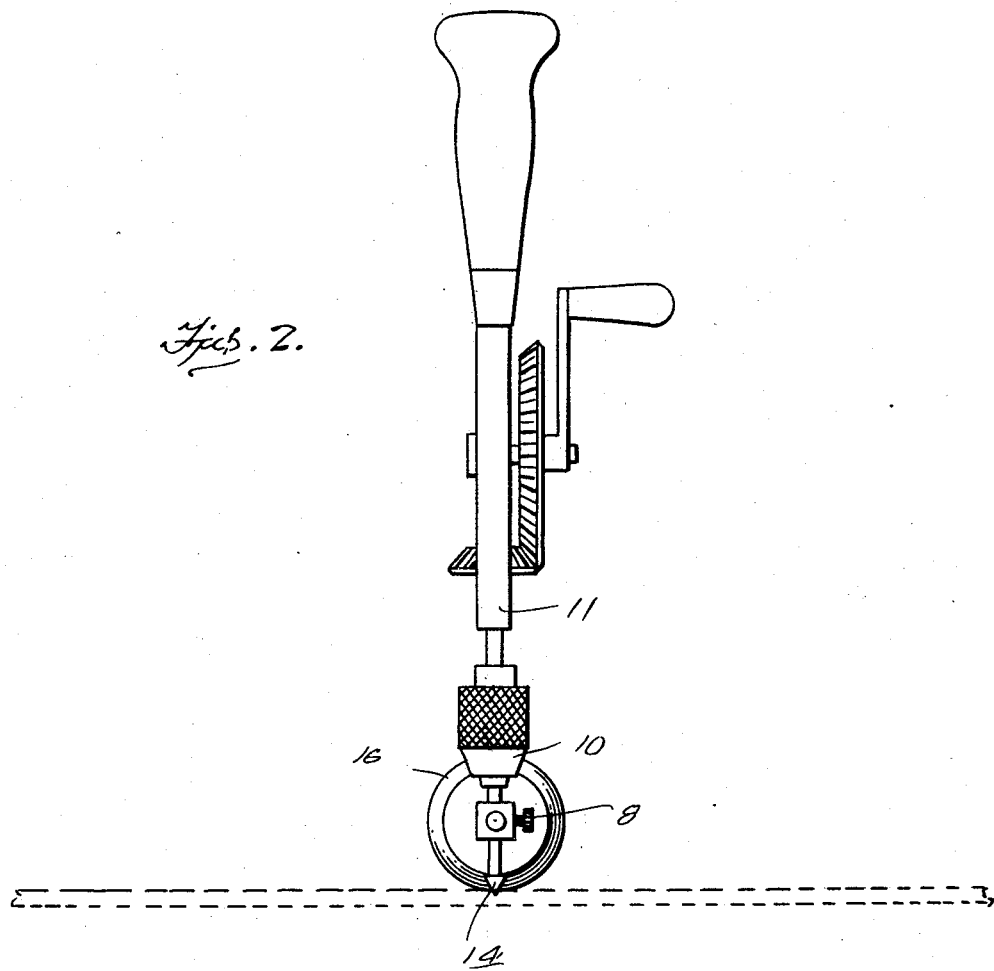
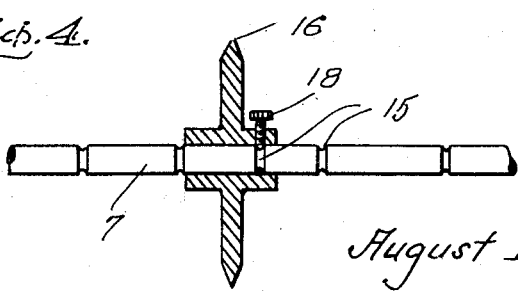
Inventor
August E. Linke
By Clarence A. O'Brien
Attorney Patented Aug. 12, 1930

1,773,048

UNITED STATES PATENT OFFICE

AUGUST E. LINKE, OF CHICAGO, ILLINOIS

CUTTER

Application filed November 20, 1929. Serial No. 408,565.

The present invention relates to cutters generally, and more particularly to cutters adapted for cutting washers, gaskets and the like from sheet material, the object being to provide a simple, cheap and effective implement for such purposes which may be used by steam fitters and the like.

With the above and numerous other objects in view as will appear as the description proceeds, the invention resides in certain novel features of construction, and in the combination and arrangement of parts as will be hereinafter more fully described and claimed.

In the drawing:

Figure 3 is a perspective view of the block, and

Figure 4 is a sectional view through one of the cutting disks.

Figure 1:
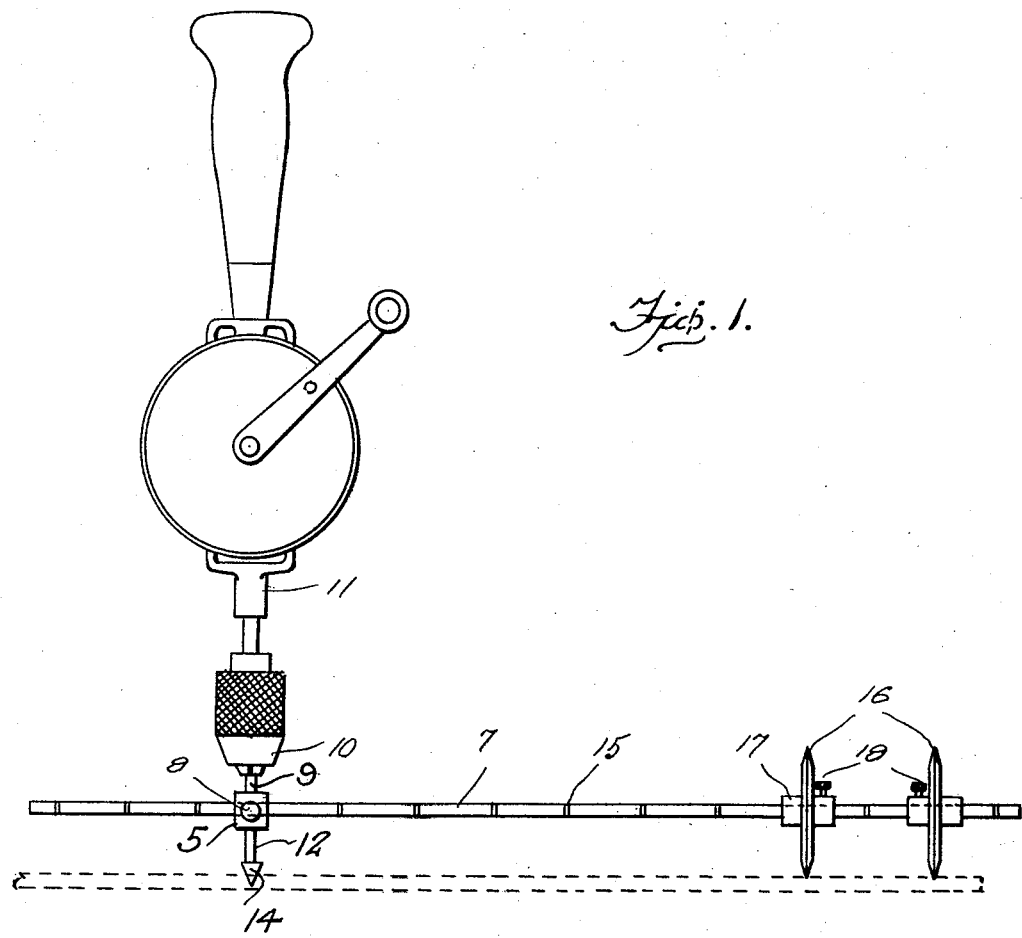
Figure 1 is a side elevation of the cutter embodying the features of my invention showing the same attached to a hand drill brake.
Figure 2:
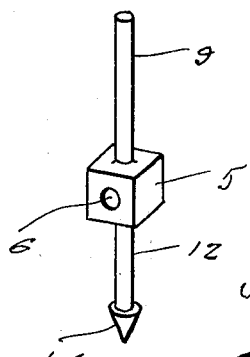
Figure 2 is an end elevation thereof.

Referring to the drawing in detail it will be seen that the numeral 5 denotes a block having a bore extending therethrough as is indicated at 6 for slidably receiving an elongated rod 7 and a set screw 8 is provided in the block so that the rod may be held in different adjusted positions.

A shank 9 rises from the block so as to be received in the grip structure 10 of a hand drill brace 11 of conventional construction. A second shank 12 depends from the block and terminates in a pointed head 14. The elongated rod 7 is provided wth a plurality of evenly spaced annular grooves 15.

A pair of cutting disks 16 are formed with hubs 17 for receiving the rod and screws 18 are threaded through the hubs to extend into the grooves 15 holding the cutting disks against endwise movement but allowing the rotation thereof.

The diameter of the gasket or washer is controlled by spacing the outer disks 16 the desired distance from the blocks, and the width of the washer or gasket is controlled by the distance the inner disk 16 is spaced from the outer disk. When the disks have been properly adjusted the pointed head 14 is forced into the gasket material and the handle drill is operated thereby swinging the rod around and causing the rotation of the cutting disks so as to cut the desired sized gasket.

It will be seen that the device is exceedingly simple and therefore may be manufactured at a low cost and further that the same is capable of being easily and readily adjusted and operated.

It is thought that the construction, operation, utility and advantages of this invention will now be quite apparent to those skilled in this art without a more detailed description thereof.

The present embodiment of the invention has been disclosed in considerable detail merely for the purpose of exemplification since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described comprising an elongated rod having a plurality of spaced annular grooves, a pair of disks having hubs receiving the rod to rotate thereon and screws threaded through the hubs to extend into the grooves to prevent endwise movement of the disks, a block from which the rod extends, and a shank rising from the block adapted to be received in the gripping mechanism of a hand drill.

2. In a device of the character described, a block having a bore extending therethrough, a shank rising from the block and adapted to be received in the gripping mechanism of a hand drill, a second shank depending from the block and terminating in a point, a rod slidable through said bore, a set screw threaded through the block for retaining the rod in adjusted position within said bore, said rod being provided with a plurality of longitudinally spaced annular grooves, disks embodying hubs slidable on said rods, set screws carried by said hubs movable in the grooves.

In testimony whereof I affix my signature.

AUGUST E. LINKE.